US008363577B2

(12) United States Patent
Ji et al.

(10) Patent No.: US 8,363,577 B2
(45) Date of Patent: Jan. 29, 2013

(54) LOW COMPLEXITY BEAMFORMING FOR MULTIPLE ANTENNA SYSTEMS

(75) Inventors: Tingfang Ji, San Diego, CA (US); Ayman Fawzy Naguib, Cupertino, CA (US); Arak Sutivong, San Diego, CA (US); Dhananjay Gore, San Diego, CA (US); Alexei Gorokhov, San Diego, CA (US); Hemanth Sampath, San Diego, CA (US); Min Dong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 924 days.

(21) Appl. No.: 11/158,585

(22) Filed: Jun. 21, 2005

(65) Prior Publication Data

US 2006/0280116 A1 Dec. 14, 2006

Related U.S. Application Data

(60) Provisional application No. 60/681,187, filed on May 13, 2005.

(51) Int. Cl.
*H04B 7/00* (2006.01)
*H04W 4/00* (2009.01)

(52) U.S. Cl. ........................................ 370/310; 370/328

(58) Field of Classification Search ................... 370/310, 370/328, 336, 343; 375/299; 455/101
See application file for complete search history.

(56) References Cited

U.S. PATENT DOCUMENTS

| | | | |
|---|---|---|---|
| 5,274,386 A | 12/1993 | Pellon | |
| 6,785,520 B2 * | 8/2004 | Sugar et al. | 455/101 |
| 6,795,392 B1 * | 9/2004 | Li et al. | 370/210 |
| 6,873,651 B2 * | 3/2005 | Tesfai et al. | 375/219 |
| 6,927,728 B2 * | 8/2005 | Vook et al. | 342/377 |
| 7,161,534 B2 * | 1/2007 | Tsai et al. | 342/377 |
| 7,289,834 B2 * | 10/2007 | Sun et al. | 455/575.5 |
| 2003/0006933 A1 | 1/2003 | Kasperkovitz et al. | |
| 2003/0228855 A1 | 12/2003 | Herz et al. | |
| 2004/0071222 A1 | 4/2004 | Liang et al. | |
| 2004/0087281 A1 | 5/2004 | Ylitalo | |
| 2004/0178954 A1 | 9/2004 | Vook et al. | |
| 2005/0047322 A1 * | 3/2005 | Sondur | 370/203 |
| 2005/0078763 A1 | 4/2005 | Choi et al. | |
| 2005/0141624 A1 * | 6/2005 | Lakshmipathi et al. | 375/260 |
| 2005/0181799 A1 * | 8/2005 | Laroia et al. | 455/450 |
| 2006/0072524 A1 * | 4/2006 | Perahia et al. | 370/338 |
| 2010/0329310 A1 | 12/2010 | Ji et al. | |

FOREIGN PATENT DOCUMENTS

| | | |
|---|---|---|
| CN | 1179856 | 4/1998 |
| EP | 1 191 706 A2 | 3/2002 |
| GB | 2 407 210 A | 4/2005 |
| JP | 2001230752 A | 8/2001 |

(Continued)

OTHER PUBLICATIONS

International Search Report and Written Opinion—PCT/US06/018357—International Search Authority, US—Dec. 26, 2006.
Taiwan Search Report—095116972, Nov. 23, 2009.
International Report on Patentability—PCT/US06/018357—The International Bureau of WIPO, Geneva, Switzerland—Nov. 14, 2007.

*Primary Examiner* — Nathan Mitchell
(74) *Attorney, Agent, or Firm* — Dimitry Milikovsky; Howard H. Seo (57) ABSTRACT

Methods and apparatuses are disclosed that utilize the discrete Fourier transform of time domain responses to generate beamforming weights for wireless communication. In addition, in some embodiments frequency subcarriers constituting less than all of the frequency subcarriers allocated for communication to a user may utilized for generating the beamforming weights.

27 Claims, 7 Drawing Sheets

FOREIGN PATENT DOCUMENTS

| | | |
|---|---|---|
| TW | 560135 | 11/2003 |
| TW | 429719 | 5/2004 |
| TW | 586293 | 5/2004 |
| WO | WO2004095851 | 11/2004 |

* cited by examiner

LOW COMPLEXITY BEAMFORMING FOR MULTIPLE ANTENNA SYSTEMS

CROSS REFERENCE

This application claims priority from Provisional Application No. 60/681,187, filed May 13, 2005, entitled "Low Complexity Beamforming For Multiple Antenna Systems" and is assigned to the assignee of the present application, which is incorporated by reference in its entirety.

BACKGROUND

I. Field

The present document relates generally to wireless communication and amongst other things to beamforming for wireless communication systems.

II. Background

An orthogonal frequency division multiple access (OFDMA) system utilizes orthogonal frequency division multiplexing (OFDM). OFDM is a multi-carrier modulation technique that partitions the overall system bandwidth into multiple (N) orthogonal frequency subcarriers. These subcarriers may also be called tones, bins, and frequency channels. Each subcarrier is associated with a respective sub carrier that may be modulated with data. Up to N modulation symbols may be sent on the N total subcarriers in each OFDM symbol period. These modulation symbols are converted to the time-domain with an N-point inverse fast Fourier transform (IFFT) to generate a transformed symbol that contains N time-domain chips or samples.

In a frequency hopping communication system, data is transmitted on different frequency subcarriers in different time intervals, which may be referred to as "hop periods". These frequency subcarriers may be provided by orthogonal frequency division multiplexing, other multi-carrier modulation techniques, or some other constructs. With frequency hopping, the data transmission hops from subcarrier to subcarrier in a pseudo-random manner. This hopping provides frequency diversity and allows the data transmission to better withstand deleterious path effects such as narrow-band interference, jamming, fading, and so on.

An OFDMA system can support multiple mobile stations simultaneously. For a frequency hopping OFDMA system, a data transmission for a given mobile station may be sent on a "traffic" channel that is associated with a specific frequency hopping (FH) sequence. This FH sequence indicates the specific subcarriers to use for the data transmission in each hop period. Multiple data transmissions for multiple mobile stations may be sent simultaneously on multiple traffic channels that are associated with different FH sequences. These FH sequences may be defined to be orthogonal to one another so that only one traffic channel, and thus only one data transmission, uses each subcarrier in each hop period. By using orthogonal FH sequences, the multiple data transmissions generally do not interfere with one another while enjoying the benefits of frequency diversity.

A problem that must be dealt with in all communication system in communication systems is that the mobile station is located in a specific portion of an area served by the base station. In such cases, there may be a problem with fading or other interference. In these cases, there may be problems with decoding of the signals received by the receiver. One way to deal with these problems is by utilizing beamforming.

Beamforming is a spatial processing technique that improves the signal-to-noise ratio of a wireless link with multiple antennas. Typically, beamforming may be used at either the transmitter or the receiver in a multiple antenna system. Beamforming provides many advantages in improving signal-to-noise ratios which improves decoding of the signals by the receiver.

A problem with beamforming for OFDM transmission systems is the computational complexity for determining the adjustments to the amplitude and phase of signals transmitted to each mobile station to each antenna. Further, the amount of memory required to store and process the beamforming weights is generally large and expensive. Therefore, there is a need to decrease the complexity of beamforming in wireless communication systems, including OFDM systems.

SUMMARY

In an embodiment, a wireless communication apparatus may comprise a memory that stores time domain response information for at least one wireless communication device and a processor that generates a plurality of beamforming weights utilizing the time domain response information in a hop region assigned to the wireless communication device. The beamforming weights may be formed utilizing less than all of the subcarrier frequencies of the hop region.

In other embodiments, a wireless communication device may comprise at least two antennas and a beamforming weight module that generates beamforming weights based upon a discrete Fourier transform for at least one frequency subcarrier in a group of frequency subcarriers that constitute less than all of a frequency band. In additional embodiments, less than all of the frequency subcarriers of the group may be utilized.

Various aspects and embodiments are described in further detail below. The applications further provide methods, processors, transmitter units, receiver units, base stations, terminals, systems, and other apparatuses and elements that implement various aspects, embodiments, and features, as described in further detail below.

BRIEF DESCRIPTION OF THE DRAWINGS

The features, nature, and advantages of the present embodiments may become more apparent from the detailed description set forth below when taken in conjunction with the drawings in which like reference characters identify correspondingly throughout and wherein.

DETAILED DESCRIPTION

Figure 1:
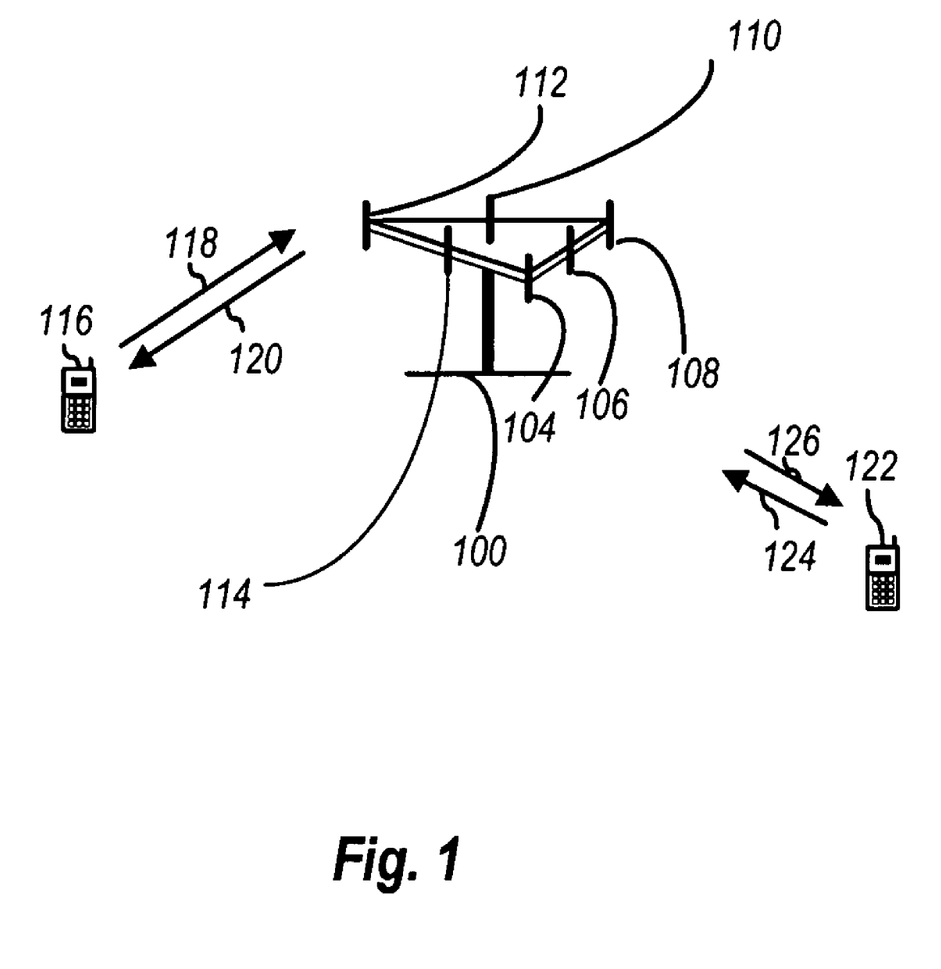
FIG. 1 illustrates a multiple access wireless communication system according to one embodiment.

Referring to FIG. 1, a multiple access wireless communication system according to one embodiment is illustrated. A base station 100 includes multiple antenna groups, one including 104 and 106, another including 108 and 110, and an additional including 112 and 114. In FIG. 1, only two antennas are shown for each antenna group, however, more or fewer antennas may be utilized for each antenna group. Mobile station 116 is in communication with antennas 112 and 114, where antennas 112 and 114 transmit information to mobile station 116 over forward link 120 and receive information from mobile station 116 over reverse link 118. Mobile station 122 is in communication with antennas 106 and 108, where antennas 106 and 108 transmit information to mobile station 122 over forward link 126 and receive information from mobile station 122 over reverse link 124.

Each group of antennas and/or the area in which they are designed to communicate is often referred to as a sector of the base station. In the embodiment, antenna groups each are designed to communicate to mobile stations in a sector, of the areas covered by base station 100.

In communication over forward links 120 and 126, the transmitting antennas of base station 100 utilize beamforming in order to improve the signal-to-noise ratio of forward links for the different mobile stations 116 and 124. Also, a base station using beamforming to transmit to mobile stations scattered randomly through its coverage causes less interference to mobile stations in neighboring cells than a base station transmitting through a single antenna to all its mobile stations.

A base station may be a fixed station used for communicating with the terminals and may also be referred to as an access point, a Node B, or some other terminology. A mobile station may also be called a mobile station, a user equipment (UE), a wireless communication device, terminal, access terminal or some other terminology.

Figure 2:
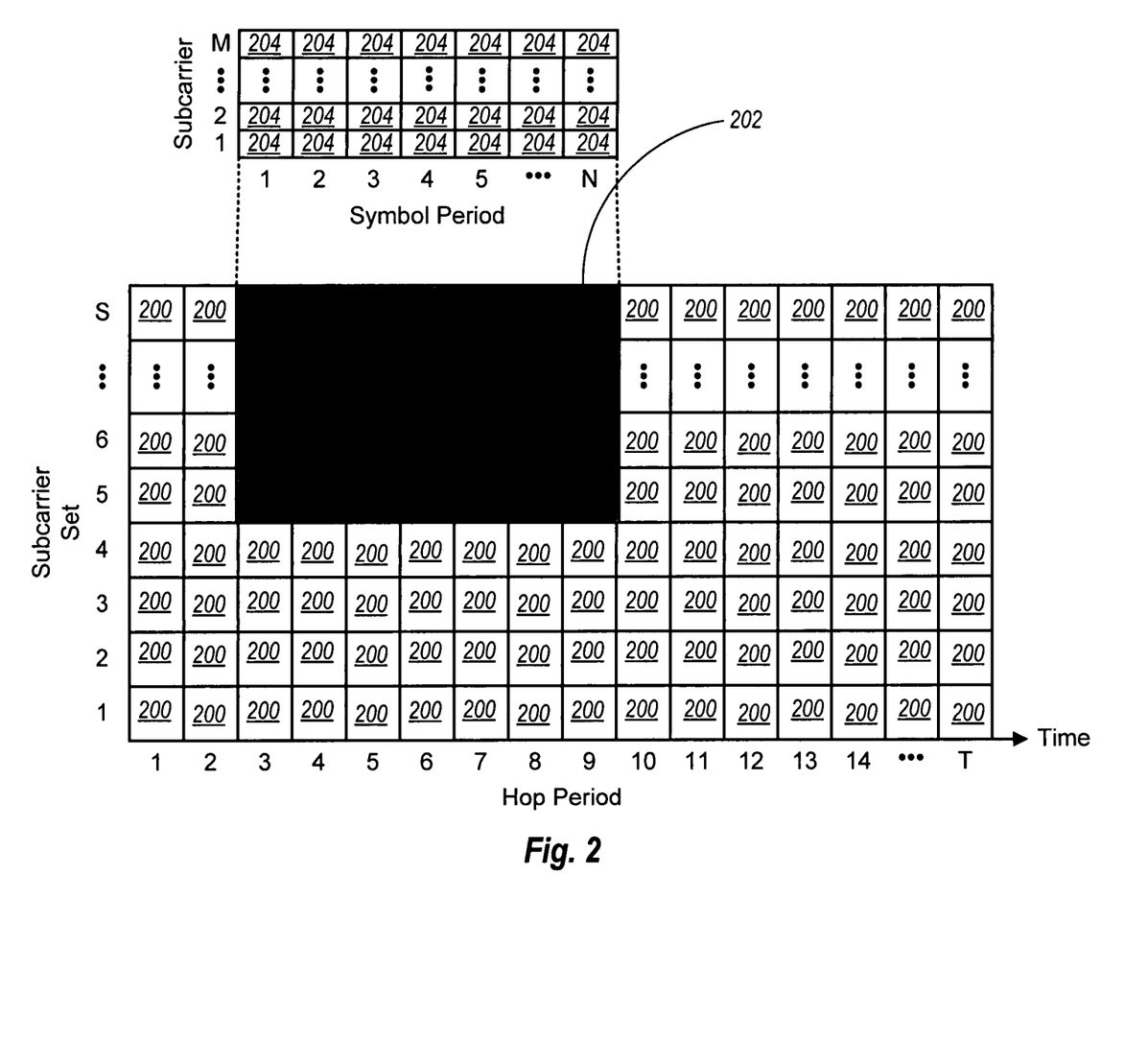
FIG. 2 illustrates a spectrum allocation scheme for a multiple access wireless communication system according to one embodiment.

Referring to FIG. 2, a spectrum allocation scheme for a multiple access wireless communication system is illustrated. A plurality of OFDM symbols 200 is allocated over T symbol periods and S frequency subcarriers that define the total bandwidth allocated for transmission for all of the mobile stations in communication with a base station. Each OFDM symbol 200 comprises one symbol period of the T symbol periods and a tone or frequency subcarrier of the S subcarriers.

In an OFDM frequency hopping system, one or more symbols 200 may be assigned to a given mobile station. In one embodiment of an allocation scheme as shown in FIG. 2, one or more hop regions, e.g., hop region 202, of symbols are assigned to one or more mobile stations for communication over a forward link. In an embodiment, one mobile station is assigned to each hop region. In other embodiments, multiple mobile stations are assigned to each hop region. Within each hop region, assignment of symbols may be randomized to reduce potential interference and provide frequency diversity against deleterious path effects in the case where multiple mobile stations are assigned to a single hop region.

Each hop region 202, here depicted as being N symbol periods by M subcarriers, includes symbols 204 that are assigned to the mobile station that are in communication with the sector of the base station and assigned to the hop region. During each hop period, or frame, the location of hop region 202 within the T symbol periods and S subcarriers varies according to a FH sequence. In addition, the assignment of symbols 204 for the individual mobile stations within hop region 202 may vary for each hop period.

The FH sequence may pseudo-randomly, randomly, or according to a predetermined sequence, select the location of the hop region 202 for each hop period. The FH sequences for different sectors of the same base station are designed to be orthogonal to one another to avoid "intra-cell" interference among the mobile station communicating with the same base station. Further, FH sequences for each base station may be pseudo-random with respect to the FH sequences for nearby base stations. This may help randomize "inter-cell" interference among the mobile stations in communication with different base stations.

In the case of a reverse link communication, some of the symbols 204 of a hop region 202 are assigned to pilot symbols that are transmitted from the mobile stations to the base station. The assignment of pilot symbols to the symbols 204 should preferably support space division multiple access (SDMA), where signals of different mobile stations overlapping on the same hop region can be separated due to multiple receive antennas at a sector or base station, provided enough difference of spatial signatures corresponding to different mobile stations.

It should be noted that while FIG. 2 depicts hop region 200 having a length of seven symbol periods, the length of hop region 200 can be any desired amount, may vary in size between hop periods, or between different hopping regions in a given hop period.

Figure 3:
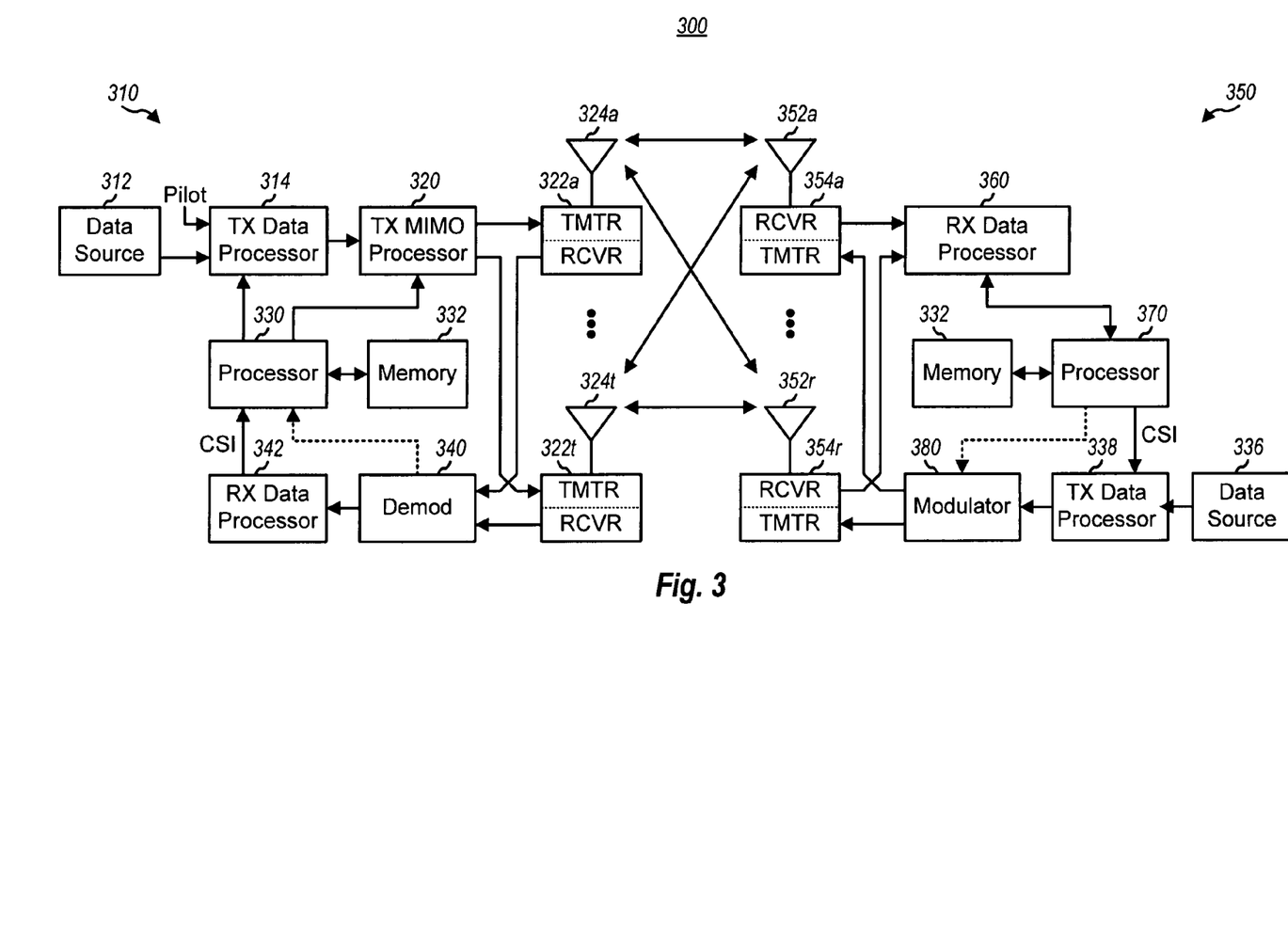
FIG. 3 illustrates a block diagram of a transmitter system and a receiver system in a MIMO system according to one embodiment.

FIG. 3 is a block diagram of an embodiment of a transmitter system 310 and a receiver system 350 in a MIMO system 300. At transmitter system 310, traffic data for a number of data streams is provided from a data source 312 to a transmit (TX) data processor 314. In an embodiment, each data stream is transmitted over a respective transmit antenna. TX data processor 314 formats, codes, and interleaves the traffic data for each data stream based on a particular coding scheme selected for that data stream to provide coded data. In some embodiments, TX data processor 314 applies beamforming weights to the symbols of the data streams based upon the user to which the symbols are being transmitted and the antenna from which the symbol is being transmitted.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 330.

The modulation symbols for all data streams are then provided to a TX MIMO processor 320, which may further process the modulation symbols (e.g., for OFDM). TX MIMO processor 320 then provides $N_T$ modulation symbol streams to $N_T$ transmitters (TMTR) 322a through 322t. In certain embodiments, TX MIMO processor 320 applies beamforming weights to the symbols of the data streams based upon the user to which the symbols are being transmitted and the antenna from which the symbol is being transmitted.

Each transmitter 322 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 322a through 322t are then transmitted from $N_T$ antennas 124a through 124t, respectively.

At receiver system 350, the transmitted modulated signals are received by $N_R$ antennas 352a through 352r and the received signal from each antenna 352 is provided to a respective receiver (RCVR) 354. Each receiver 354 conditions (e.g., filters, amplifies, and downconverts) a respective received signal, digitizes the conditioned signal to provide samples, and further processes the samples to provide a corresponding "received" symbol stream.

An RX data processor 360 then receives and processes the $N_R$ received symbol streams from $N_R$ receivers 354 based on a particular receiver processing technique to provide $N_T$ "detected" symbol streams. The processing by RX data processor 360 is described in further detail below. Each detected symbol stream includes symbols that are estimates of the modulation symbols transmitted for the corresponding data stream. RX data processor 360 then demodulates, deinterleaves, and decodes each detected symbol stream to recover the traffic data for the data stream. The processing by RX data processor 360 is complementary to that performed by TX MIMO processor 320 and TX data processor 314 at transmitter system 310.

The channel response estimate generated by RX processor 360 may be used to perform space, space/time processing at the receiver, adjust power levels, change modulation rates or schemes, or other actions. RX processor 360 may further estimate the signal-to-noise-and-interference ratios (SNRs) of the detected symbol streams, and possibly other channel characteristics, and provides these quantities to a processor 370. RX data processor 360 or processor 370 may further derive an estimate of the "operating" SNR for the system. Processor 370 then provides channel state information (CSI), which may comprise various types of information regarding the communication link and/or the received data stream. For example, the CSI may comprise only the operating SNR. The CSI is then processed by a TX data processor 338, which also receives traffic data for a number of data streams from a data source 376, modulated by a modulator 380, conditioned by transmitters 354a through 354r, and transmitted back to transmitter system 310.

At transmitter system 310, the modulated signals from receiver system 350 are received by antennas 324, conditioned by receivers 322, demodulated by a demodulator 340, and processed by a RX data processor 342 to recover the CSI reported by the receiver system. The reported CSI is then provided to processor 330 and used to (1) determine the data rates and coding and modulation schemes to be used for the data streams and (2) generate various controls for TX data processor 314 and TX MIMO processor 320.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 3 discusses a MIMO system, the same system may be applied to a multi-input single-output system where multiple transmit antennas, e.g., those on a base station, transmit one or more symbol streams to a single antenna device, e.g., a mobile station. Also, a single output to single input antenna system may be utilized in the same manner as described with respect to FIG. 3.

Figure 4:
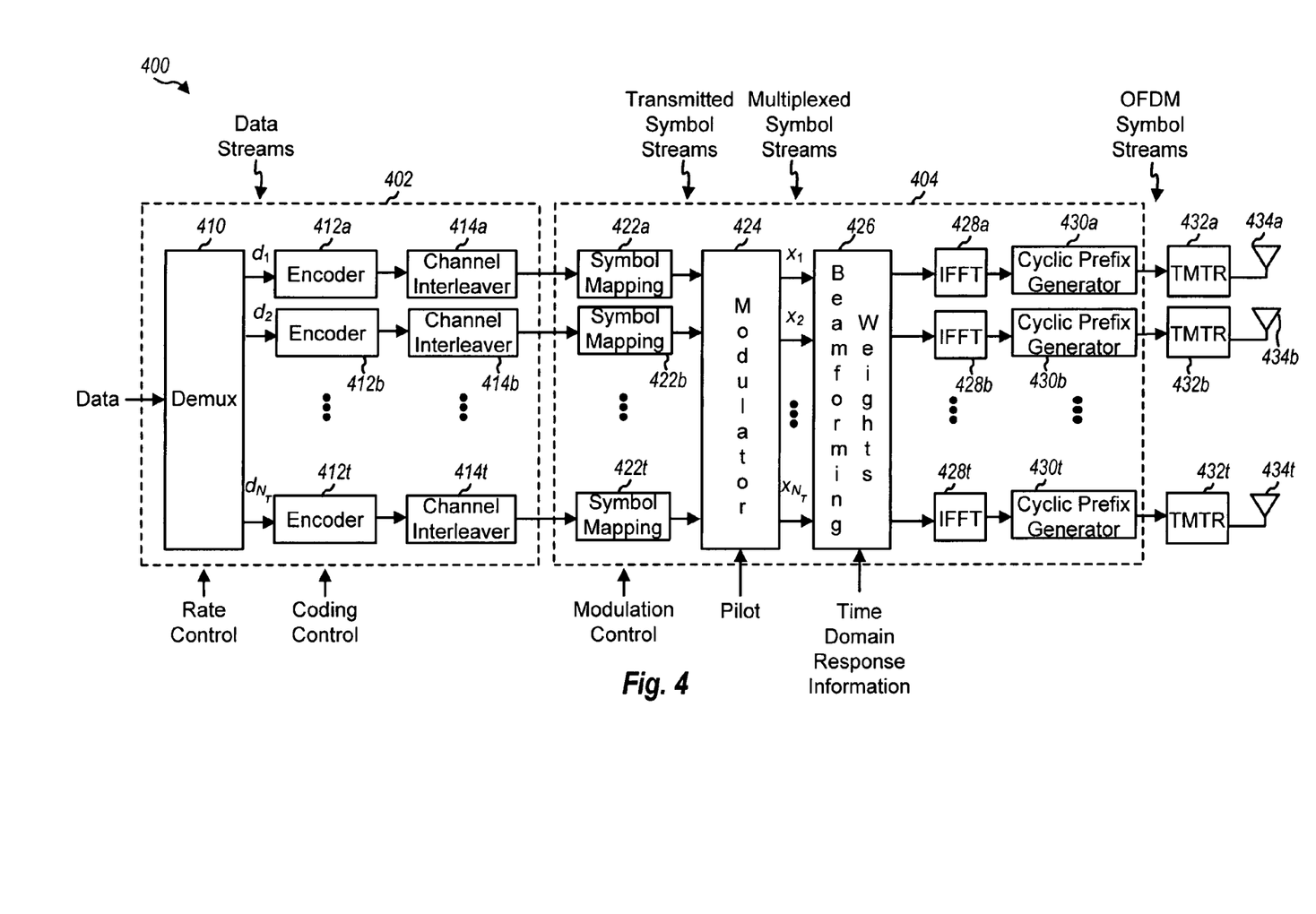
FIG. 4 illustrates a functional block diagram of a transmitter system including multiple transmit antennas according to one embodiment.

Referring to FIG. 4, a functional block diagram of a transmitter system including multiple transmit antennas according to one embodiment is illustrated. In one embodiment, a separate data rate and coding and modulation scheme may be used for each of the $N_T$ data streams to be transmitted on the $N_T$ transmit antennas (i.e., separate coding and modulation on a per-antenna basis). The specific data rate and coding and modulation schemes to be used for each transmit antenna may be determined based on controls provided by processor 330 (FIG. 3), and the data rates may be determined as described above.

Transmitter unit 400 includes, in one embodiment, a transmit data processor 402 that receives, codes, and modulates each data stream in accordance with a separate coding and modulation scheme to provide modulation symbols for transmission from multiple antennas. Transmit data processor 402 and transmit processor 404 are one embodiment of transmit data processor 314 and transmit MIMO processor 320, respectively, of FIG. 3.

In one embodiment, as shown in FIG. 4, transmit data processor 402 includes demultiplexer 410, $N_T$ encoders 412a through 412t, and $N_T$ channel interleavers 414a through 414t (i.e., one set of demultiplexers, encoders, and channel interleavers for each transmit antenna). Demultiplexer 410 demultiplexes data (i.e., the information bits) into $N_T$ data streams for the $N_T$ transmit antennas to be used for data transmission. The $N_T$ data streams may be associated with different data rates, as determined by rate control functionality, which in one embodiment may be provided by processor 330 or 370 (FIG. 3). Each data stream is provided to a respective encoder 412a through 412t.

Each encoder 412a through 412t receives and codes a respective data stream based on the specific coding scheme selected for that data stream to provide coded bits. In one embodiment, the coding may be used to increase the reliability of data transmission. The coding scheme may include in one embodiment any combination of cyclic redundancy check (CRC) coding, convolutional coding, Turbo coding, block coding, or the like. The coded bits from each encoder 412a through 412t are then provided to a respective channel interleaver 414a through 414t, which interleaves the coded bits based on a particular interleaving scheme. The interleaving provides time diversity for the coded bits, permits the data to be transmitted based on an average SNR for the transmission channels used for the data stream, combats fading, and further removes correlation between coded bits used to form each modulation symbol.

The coded and interleaved bits from each channel interleaver 414a through 414t are provided to a respective symbol mapping block 422a through 422t, of transmit processor 404, which maps these bits to form modulation symbols.

The particular modulation scheme to be implemented by each symbol mapping block 422a through 422t is determined by the modulation control provided by processor 330 (FIG. 3). Each symbol mapping block 422a through 422t groups sets of $q_j$ coded and interleaved bits to form non-binary symbols, and further maps each non-binary symbol to a specific point in a signal constellation corresponding to the selected modulation scheme (e.g., QPSK, M-PSK, M-QAM, or some other modulation scheme). Each mapped signal point corresponds to an $M_j$-ary modulation symbol, where $M_j$ corresponds to the specific modulation scheme selected for the j-th transmit antenna and $M_j=2^{q_j}$. Symbol mapping blocks 422a through 422t then provide $N_T$ streams of modulation symbols.

In the specific embodiment illustrated in FIG. 4, transmit processor 404 also includes a modulator 424, beamforming weights module 426, and inverse Fast Fourier transform (IFFT) block 428a through 428t, along with symbol mapping blocks 422a through 422t. Modulator 424 modulates the samples to form the modulation symbols for the $N_T$ streams on the proper subbands and transmit antennas. In addition modulator 424 provides each of the $N_T$ symbol streams at a prescribed power level. In one embodiment, modulator 424 may modulate symbols according to a FH sequence controlled by a processor, e.g., processor 330 or 370. In such an embodiment, the frequencies with which the $N_T$ symbol streams are modulated may vary for each group or block of symbols, frame, or portion of a frame of a transmission cycle.

Beamforming weight module 426 generates weights that are used to multiply the transmission symbols, .e.g. by altering their amplitude and/or phase. The weights may be generated using a discrete Fourier transform (DFT) of a time domain response information for a hop region in which the symbols, to which the weights are to be utilized for, are to be transmitted. In this way DFT may be applied for only one or more sub-carriers of the hop region, thereby providing a high level of resolution for a small frequency range that corresponds to the reduced frequency band of the hop region when compared to the entire frequency band. The beamforming weights may be generated within beamforming weight module 426, as depicted in FIG. 3, or may be formed by transmit processor 404 and provided to beamforming weight module 426 that applies the weights to the modulated symbols.

Each IFFT block 428a through 428t receives a respective modulation symbol stream from beamforming weight module 426. Each IFFT block 428a through 428t groups sets of $N_F$ modulation symbols to form corresponding modulation symbol vectors, and converts each modulation symbol vector into its time-domain representation (which is referred to as an OFDM symbol) using the inverse fast Fourier transform. IFFT blocks 428a through 428t may be designed to perform the inverse transform on any number of frequency subchannels (e.g., 8, 16, 32, ..., $N_F$,).

Each time-domain representation of the modulation symbol vector generated by IFFT blocks 428a through 428t is provided to an associated cyclic prefix generator 430a through 430t. The cyclic prefix generators 430a through 430t pre-pending a prefix of a fixed number of samples, which are generally a number of samples from the end of the OFDM symbol, to the $N_S$ samples that constitute an OFDM symbol to form a corresponding transmission symbol. The prefix is designed to improve performance against deleterious path effects such as channel dispersion caused by frequency selective fading. Cyclic prefix generators 430a through 430t then provide a stream of transmission symbols to transmitters 432a through 432t, which then cause the transmission symbols to be transmitted by antennas 434a through 434t, respectively.

Figure 5:
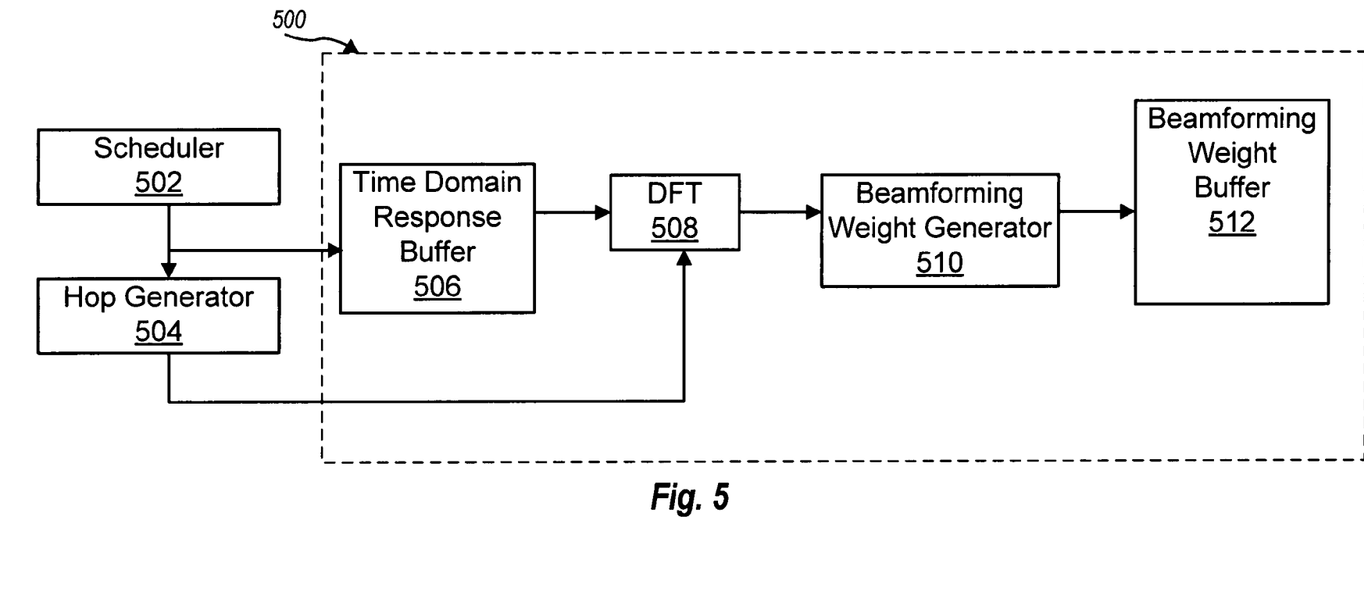
FIG. 5 illustrates a functional block diagram of a beamforming system in a transmitter system according to one embodiment.

Referring to FIG. 5, a functional block diagram of a beamforming system in a transmitter system according to one embodiment is illustrated. Beamforming system 500, which may be beamforming weight module 426 of FIG. 4, is in communication with a scheduler 502 that provides the scheduling within a hop region for the user stations. Scheduler 502 is in communication with a hop generator 504 that generates the frequency FH sequences. The frequency FH sequences may be generated in any number of manners and is not to be limited to any particular sequence.

Scheduler 502 is also in communication with time domain response buffer 506 that contains the time domain response information for the mobile stations that are in communication with the base station. The time domain response information may be provided by estimating channel conditions from pilots, transmitted from the desired mobile stations, at the base station. The time domain response information may be obtained by estimating reverse link transmissions, e.g., those transmitted on dedicated reverse link traffic or control channels, from the desired mobile station. The time domain response information may also be quantized forward link transmission channel response estimates that are calculated and fed-back from the mobile station. The time domain response information may be, for example, can be signal-to-noise ratio information, multi-path information, or other channel response information.

Both hop generator 504 and time domain response buffer 506 communicate with discrete Fourier transform (DFT) block 508. In one embodiment, DFT block 508 may provide an N-point DFT.

In one embodiment, the DFT operation may be defined by $$H(k) = \sum_{l=1}^{L} h_n(l) \exp\left(\frac{2\pi k \tau_n(l)}{K}\right), \quad \text{Eq (1)}$$

where K denotes the total number of frequency blocks (or hops) over the whole frequency band, $h_n(l)$ and $\tau_n(l)$ denote the $l^{th}$ multipath of user n, H(k) denotes the system frequency response over hop k, and L denotes the total number of multipaths to be computed. Beamforming is then performed over hop k, for each hop region, based on H(k). In one embodiment, determining the DFT operation includes reading $h_n(l)$ and $\tau_n(l)$ from time domain response buffer 506 and a table lookup for $$\exp\left(\frac{2\pi k \tau_n(l)}{N}\right),$$

which could be precomputed for all possible paths based upon projected channel conditions and traffic patterns. In another embodiment, $$\exp\left(\frac{2\pi k \tau_n(l)}{N}\right)$$

may be computed in real time or interpolated from the pre-computed values.

Utilizing DFT allows an L-tap time-response to be converted to a K arbitrary frequency point with the complexity of K times L complex multiplications (CM). Conversely, the fast Fourier transform (FFT) can efficiently convert a channel time response to an N-point frequency response with the complexity of N Log(N) CM. As such, FFT may be inefficient to obtain a small number of frequency points out of a frequency response for a large bandwidth or large portions of the large bandwidth.

In an OFDMA system that utilizes hop regions, with one or more users assigned to each hop region, only a small fraction of the frequency response of each user may be used for beamforming. This is because, each user is only scheduled on a small fraction of the total available frequency subcarriers in an OFDMA system, i.e. the frequency subcarriers of the hop region. In some embodiments, in order to further reduce complexity, the discrete Fourier transform may be performed for only the center frequency subcarrier of the hop region for each mobile station, for the center frequency subcarrier and the edge frequency subcarriers of the hop region, even or odd frequency subcarriers of the hop region, or another number or location of frequency subcarriers that are less than all of the frequency subcarriers assigned to the hop region.

In an OFDMA system that utilizes hop regions for transmission to the mobile station, a constant beamforming weight could be applied to an entire hop region without significant performance loss. In some embodiments, a wireless communication system, may have a maximum delay spread of significant multipaths of less than a few microseconds (μs). For example, in the International Telephone Union (ITU) pedestrian-B and vehicular-A channel models, the −10 decibel (dB) paths are defined at 2.3 and 1.1 μs from the first path, respectively. The corresponding coherence bandwidth is on the order of hundreds of kilohertz (KHz). Since channel does not decorrelate in hundreds of KHz, the beamforming weight may remain constant over tens of subcarriers if those subcarriers are a few KHz each. In the example mentioned above, users could be assigned channels in 100 KHz blocks, i.e., the 20 megahertz (MHz) frequency response could be obtained by a 200-point DFT. If the 10 most dominant paths are kept for each user, the total complexity of generating the frequency response over 8 antennas would 16000 CM, compared to the 13 million CM for calculating the weights based upon the entire bandwidth. In this case, the total memory requirement would be on the order of 200 kilobits (Kbits) compared to the 16 megabits (Mbits).

Figure 6:
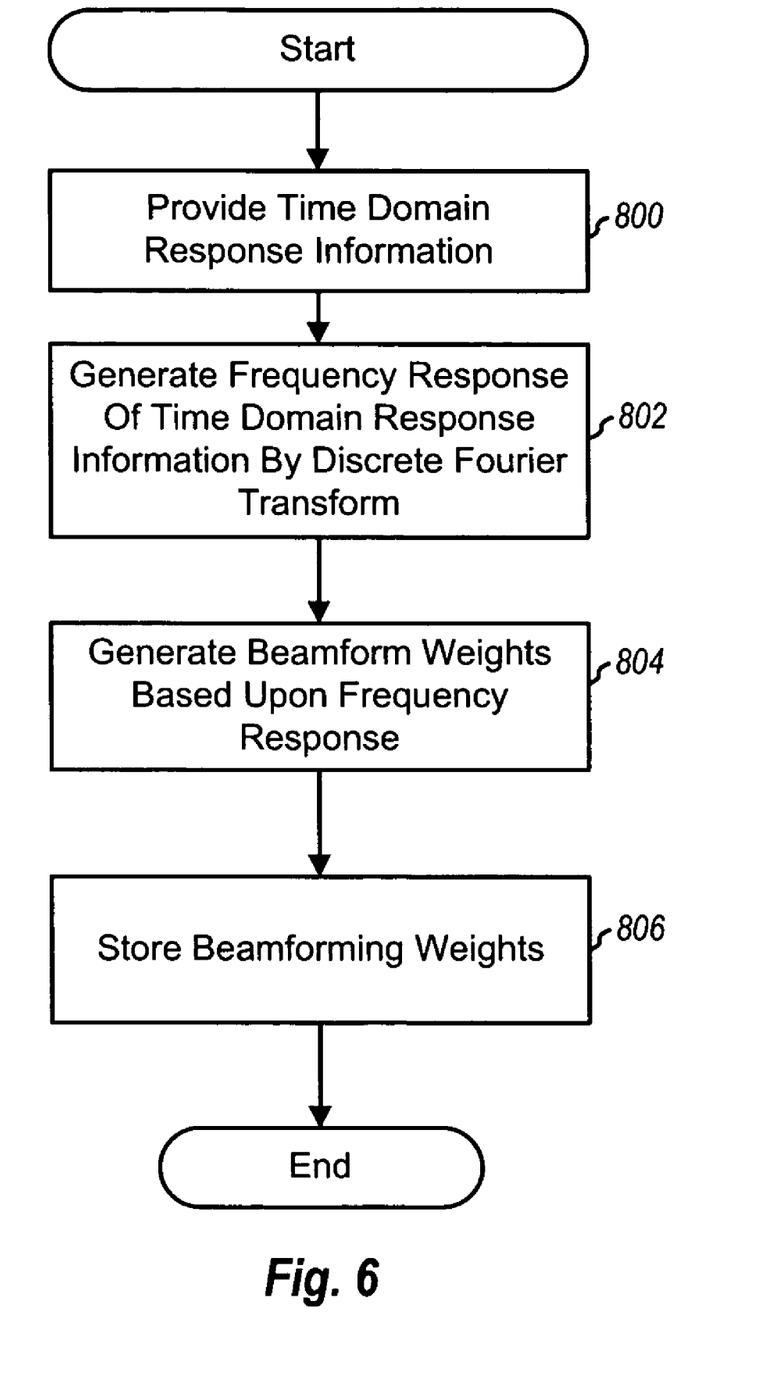
FIG. 6 illustrates a process of beamforming weight generation according to one embodiment.

Referring to FIG. 6, a process of beamforming weight generation according to one embodiment is illustrated. Time domain response information is provided, block 800. The time domain response information may correspond to signal-to-noise ratio information, multi-path information, or other channel response information and may be provided by pilot information transmitted by the mobile station. The time domain response information may be provided by estimating channel conditions from pilots, transmitted from the desired mobile stations, at the base station. The time domain response information may be obtained by estimating reverse link transmissions, e.g., those transmitted on dedicated reverse link traffic or control channels, from the desired mobile station. The time domain response information may also be quantized forward link transmission channel response estimates that are calculated and fed-back from the mobile station. In other embodiments, the time domain response information may be otherwise determined.

A discrete Fourier transform is applied to the time domain response information, block 802. The beamforming weights are then generated based upon the discrete Fourier transform of the time domain response information, block 804.

The beamforming weights may be generated in any number of ways. For example, in one embodiment, a maximum ratio combining (MRC) algorithm may be applied. In an embodiment, an MRC algorithm may form beamforming weights by utilizing a complex conjugate of the channel response for the antenna and then normalizing the complex conjugate of the channel response by the norm of channel response for all of the transmitter antennas. In an embodiment, the beamforming weight vector for all antennas may be given by:

$$\underline{w}_n = \underline{h}_n^* / \sqrt{\sum_{m=1}^{M_T} \mathrm{Re}(h_{n,m})^2 + \mathrm{Im}(h_{n,m})^2},$$

where $h_n$ denotes the vector frequency channel response of the desired hop region n and $M_T$ denotes the number of transmit antennas. Note that the resulting beamforming weights have a unit power. The actual transmitted power will be determined by the power control algorithm, which will scale the transmit power based upon the unit power.

In another embodiment, beamforming weights may be formed by an equal gain combining algorithm. This embodiment does not utilize amplitude calibration of the transceiver chain. In one embodiment, equal combining may comprise forming a complex conjugate of the channel response and then applying a phase shift such that the phase of the beamforming weight for each antenna is the same as the phase of the complex conjugate of the channel response for the hop region. In an embodiment, each beamforming weight for a given frequency subcarrier is given by $\underline{w}_{n,m} = \underline{h}_{n,m}^* / \sqrt{M(\mathrm{Re}(h_{n,m})^2 + \mathrm{Im}(h_{n,m})^2)}$ where $h_{n,m}$ denotes the frequency channel response of hop region n and antenna m. In such embodiments, the resulting beamforming weights have a constant power over each antenna.

In an additional embodiment, beamforming weights may be formed by an equal peak antenna power algorithm. This embodiment may be utilized if it is believed the antenna power to be utilized may be impractical, as a result of a high degree of inequality of the beamforming weights applied to each of the transmitter antennas. For example, considering a two antenna transmitter system. If one of the transmit antennas is under a deep fade, for example, zero channel gain, the optimal MRC beamforming weights may have zero power on this antenna and power 1 on the other antenna. However, each antenna is peak power limited so that the sum of the power of beamforming weights for each antenna over all hop regions being transmitted at a given period should be less than or equal to N/M where N is the total number of hop regions and M is the total number of Tx antennas. In one embodiment, an equal peak antenna power algorithm generates beamforming weights for all of the hop regions for a given antenna according to an MRC algorithm and then scales the beamforming weights on each antenna by the power allotted to that antenna for some burst period, hop region, symbol period, or other time period that includes the hop regions. Give the MRC beamforming weight $w_{n,m}$ for each hop region n and antenna m, the normalized antenna power for antenna m is given by $$P_m = \sum_{n=1}^{N} w_{n,m}^2.$$

The equal peak power beamforming weight for hop n and antenna m is given by $$w'_{n,m} = w_{n,m} \sqrt{\frac{N}{MP_m}}.$$

In a further embodiment, beamforming weights may be formed by a weighted power algorithm. In the previous embodiment, all antennas are scaled to transmit at equal power. This may be undesirable if the interference introduced by power scaling causes system performance degradation. In one embodiment, a weighted power algorithm generates beamforming weights for all of the hop regions for a given antenna according to an MRC algorithm and then scales all beamforming weights by the power of the antenna with maximum pre-scaling transmit power for the burst period, hop region, or other time period. More specifically, compute the normalized antenna power $P_m$ for each antennas as specified in previous embodiment, then use the largest antenna power $P_{max}$ to formulate a common scaling factor for all antennas, i.e., $$w'_{n,m} = w_{n,m} \sqrt{\frac{N}{MP_{max}}}.$$

In other embodiments, the beamforming weights may be scaled by the total transmit power for all the transmit antennas.

The beamforming weights are then stored for later use, block 806, or otherwise utilized to form the symbols for transmission over the antennas for the burst period.

Figure 7:
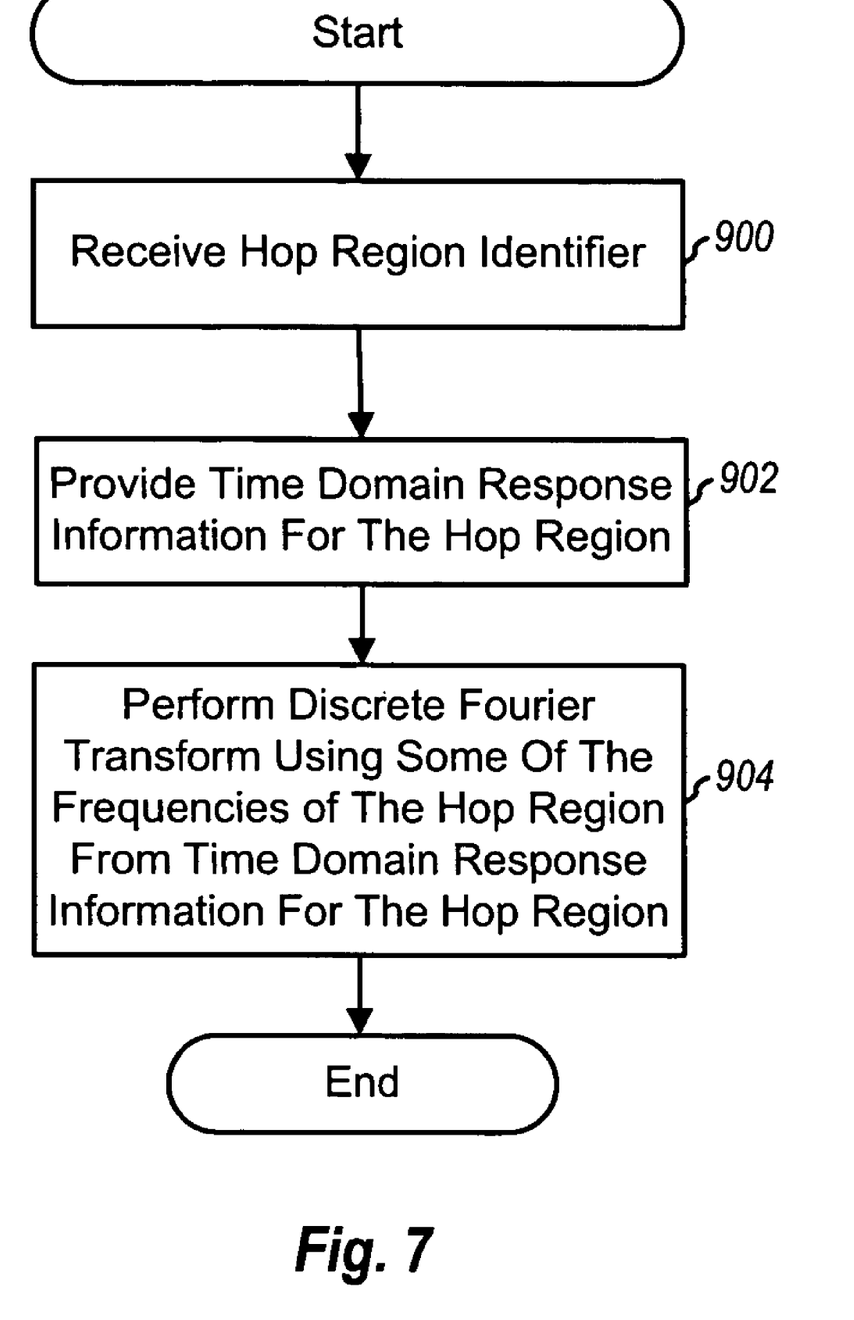
FIG. 7 illustrates of a process of performing a low complexity discrete Fourier transform for beamforming weight generation according to one embodiment.

Referring to FIG. 7, a process of performing a low complexity discrete Fourier transform for beamforming weight generation according to one embodiment is illustrated. A hop region identifier is received, block 900. The hop region identifier, which may be provided by a hop region generator, identifies the frequency subcarriers in which transmission to a particular mobile station will be scheduled. Time domain response information for the hop region is then provided, block 902. Alternatively, the time domain response information may be provided simultaneously with the hop region identifier.

The DFT is applied to the time domain response information for less than all of the frequency subcarriers of the hop region, block 904. In some embodiments, the discrete Fourier transform may be performed for only the center frequency subcarrier of the hop region for each mobile station, for the center frequency subcarrier and the edge frequency subcarriers of the hop region, even or odd frequency subcarriers of the hop region, or another number or locations of frequency subcarriers that are less than all of the frequency subcarriers assigned to the hop region.

The techniques described herein may be implemented by various means. For example, these techniques may be implemented in hardware, software, or a combination thereof. For a hardware implementation, the processing units within a base station or a mobile station may be implemented within one or more application specific integrated circuits (ASICs), digital signal processors (DSPs), digital signal processing devices (DSPDs), programmable logic devices (PLDs), field programmable gate arrays (FPGAs), processors, processors, micro-processors, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments may be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless communication apparatus, comprising:
at least two antennas; a beamforming weight module that generates beamforming weights based upon a discrete Fourier transform for at least one frequency subcarrier in a group of frequency subcarriers that constitute less than all of the frequency subcarriers assigned to a hop region, the beamforming weight module comprising a discrete Fourier transform processor that performs the discrete Fourier transform on time domain response information for the at least one frequency subcarrier; and a scheduler coupled with the discrete Fourier transform processor that provides a location of the group of frequency subcarriers to the discrete Fourier transform processor.

2. A method of generating beamforming weights for a wireless transmitter, comprising:
determining a location of a group of subcarriers that constitute less than all of the frequency subcarriers assigned to a hop region;
obtaining time domain response information for at least one frequency subcarrier in the group of subcarriers;
performing a discrete Fourier transform on the time domain response information; and
generating beamforming weights based on the discrete Fourier transform.

3. A wireless communication apparatus, comprising:
at least two antennas;
scheduling means for determining a location of a group of subcarriers that constitute less than all of the frequency subcarriers assigned to a hop region; and
a beamforming weight module comprising
means for obtaining time domain response information for at least one frequency subcarrier in the group of subcarriers,
means for performing a discrete Fourier transform on the time domain response information, and
means for generating beamforming weights based on the discrete Fourier transform.

4. A non-transitory computer-readable medium having stored thereon computer-executable instructions for causing the computer to:
determine a location of a group of subcarriers that constitute less than all of the frequency subcarriers assigned to a hop region;
obtain time domain response information for at least one frequency subcarrier in the group of subcarriers;
perform a discrete Fourier transform on the time domain response information; and
generate beamforming weights based on the discrete Fourier transform.

5. The wireless communication apparatus of claim 1, further comprising a memory that stores the beamforming weights.

6. The wireless communication apparatus of claim 1, wherein the at least one frequency subcarrier comprises only one of the frequency subcarriers of the hop region.

7. The wireless communication apparatus of claim 1, wherein the beamforming weight module generates the beamforming weights utilizing maximum ratio combining.

8. The wireless communication apparatus of claim 1, wherein the beamforming weight module generates the beamforming weights utilizing maximum ratio combining and normalizing according to a greatest power to be generated on each antenna of the at least two antennas.

9. The wireless communication apparatus of claim 1, wherein the beamforming weight module generates the beamforming weights utilizing maximum ratio combining and normalizing according to a same constant for all antennas such that one of the antennas reaches a power limit.

10. The wireless communication apparatus of claim 1, wherein the beamforming weight module generates the beamforming weights utilizing maximum ratio combining and normalizing according the total power to be generated from the at least two antennas.

11. The method of claim 2, wherein only a center frequency subcarrier is used as the at least one frequency subcarrier.

12. The method of claim 2, wherein generating the beamforming weights comprises utilizing maximum ratio combining.

13. The method of claim 2, wherein generating the beamforming weights comprises utilizing maximum ratio combining and normalizing according to a greatest power to be generated on each antenna of at least two antennas.

14. The method of claim 2, wherein generating the beamforming weights comprises utilizing maximum ratio combining and normalizing according to a same constant for all antennas such that one antenna reaches a power limit.

15. The method of claim 2, wherein generating the beamforming weights comprises utilizing maximum ratio combining and normalizing according the total power to be generated from at least two antennas.

16. The method of claim 2, wherein generating the beamforming weights comprises utilizing phase shifting according to the complex conjugate of a channel response of a wireless communication device.

17. The apparatus of claim 3, wherein the group of frequency subcarriers consists of only a center frequency subcarrier.

18. The apparatus of claim 3, wherein means for generating comprises means for generating the beamforming weights by utilizing maximum ratio combining.

19. The apparatus of claim 3, wherein means for generating comprises means for generating the beamforming weights by utilizing maximum ratio combining and normalizing according to a greatest power to be generated on each antenna of the at least two antennas.

20. The apparatus of claim 3, wherein means for generating comprises means for generating the beamforming weights by utilizing maximum ratio combining and normalizing according to a same constant for all antennas such that one of the antennas reaches a power limit.

21. The apparatus of claim 3, wherein means for generating comprises means for generating the beamforming weights by utilizing maximum ratio combining and normalizing according the total power to be generated from the at least two antennas.

22. The apparatus of claim 3, wherein means for generating comprises means for generating the beamforming weights by utilizing phase shifting according to the complex conjugate of a channel response of the wireless communication device.

23. The computer-readable medium of claim 4, wherein the instructions to generate the beamforming weights comprise instructions to utilize maximum ratio combining.

24. The computer-readable medium of claim 4, wherein the instructions to generate the beamforming weights comprise instructions to utilize maximum ratio combining and normalizing according to a greatest power to be generated on each antenna of at least two antennas.

25. The computer-readable medium of claim 4, wherein the instructions to generate the beamforming weights comprise instructions to utilize maximum ratio combining and normalizing according to a same constant for all antennas such that one antenna reaches a power limit.

26. The computer-readable medium of claim 4, wherein the instructions to generate the beamforming weights comprise instructions to utilize maximum ratio combining and normalizing according the total power to be generated from at least two antennas.

27. The computer-readable medium of claim 4, wherein the instructions to generate the beamforming weights comprise instructions to utilize phase shifting according to the complex conjugate of a channel response of a wireless communication device.

* * * * *